United States Patent [19]

Schule

[11] Patent Number: 5,072,964

[45] Date of Patent: Dec. 17, 1991

[54] TRAILER COUPLER SAFETY CABLE DEVICE

[76] Inventor: Earl A. Schule, HCR 3, Box 266, Deer River, Minn. 56636

[21] Appl. No.: 647,151

[22] Filed: Jan. 29, 1991

Related U.S. Application Data

[63] Continuation of Ser. No. 388,816, Dec. 13, 1989, abandoned.

[51] Int. Cl.⁵ ............................................. B60D 1/28
[52] U.S. Cl. .................................. 280/457; 280/511; 403/212
[58] Field of Search ............... 280/506, 507, 511, 457, 280/480; 403/212

[56] References Cited

U.S. PATENT DOCUMENTS

| | | | |
|---|---|---|---|
| 3,123,383 | 3/1964 | Humpal | 280/457 |
| 3,326,589 | 6/1967 | Wenk | 403/212 X |
| 3,471,170 | 10/1967 | Rendessy | 280/457 X |
| 3,827,722 | 8/1974 | Miller et al. | 280/457 X |
| 3,873,131 | 3/1975 | Adams | 280/457 X |

Primary Examiner—Charles A. Marmor
Assistant Examiner—Alan M. Kagen
Attorney, Agent, or Firm—Palmatier & Sjoquist

[57] ABSTRACT

A safety cable trailer coupler having a steel cable loop for encircling the shank of a ball hitch. The cable is fed through a slidable sleeve and the ends of the cable are pressed into a ferrule, and the ferrule may be bolted to a trailer tongue immediately behind the trailer coupler.

1 Claim, 1 Drawing Sheet

TRAILER COUPLER SAFETY CABLE DEVICE

This is a continuation of my U.S. patent application Ser. No. 388,816, filed Dec. 13, 1989 now abandoned.

BACKGROUND OF THE INVENTION

This invention relates to a safety cable trailer coupler device. It is known that ball-and-socket trailer couplers will often fail, whereupon the trailed vehicle will be released from the tow vehicle, frequently causing an accident.

SUMMARY OF THE INVENTION

The invention includes a ferrule which is bolted to the underside of the tongue of a trailer, the ferrule having two ends of a cable loop affixed thereto. The cable loop passes through a slidable sleeve, which may be moved along the loop to increase and decrease the loop opening size. The cable loop may be fitted over a trailer hitch ball, and the sleeve may be moved to enclose the loop about the neck of the trailer hitch ball, thereby providing a close coupling to the trailer hitch ball. With this connection, the tongue of the towed vehicle will not drop more than a fraction of an inch upon failure or breakage of the coupler, which prevents the trailer tongue from whipping from side to side.

DESCRIPTION OF THE PREFERRED EMBODIMENT

Figure 1:
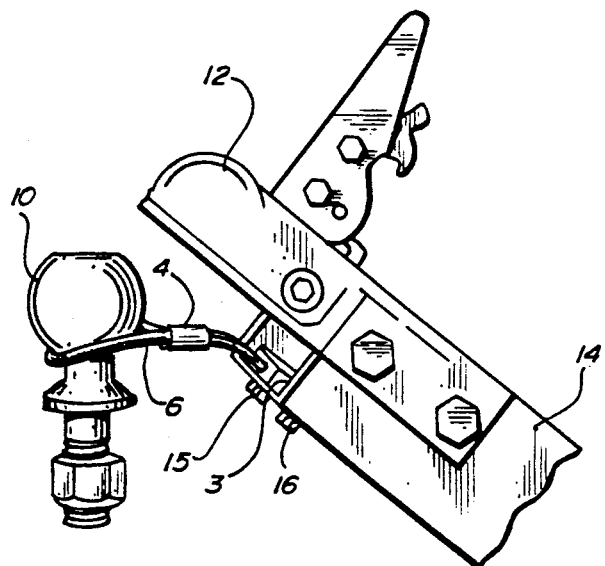
FIG. 1 shows the invention coupled to a trailer hitch ball prior to connecting the trailer coupler.
Figure 2:
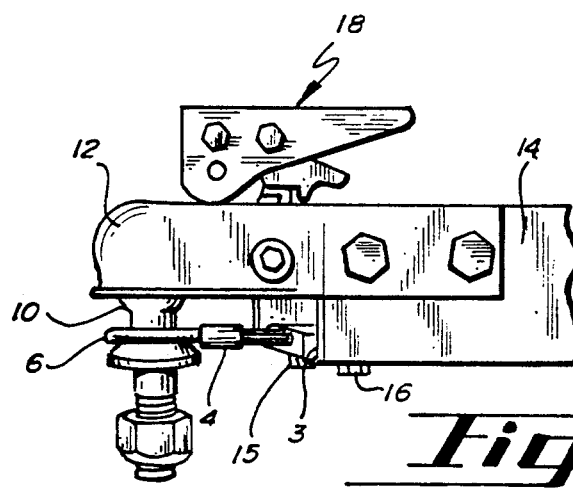
FIG. 2 shows the invention in operable use.

FIG. 1 shows the invention looped about a trailer ball 10, and bolted to a trailer tongue 14 by means of bolts 15, 16, in a position prior to coupling the trailer socket 12 to the trailer ball 10. FIG. 2 shows the same connection after the trailer coupler socket 12 has been secured to the trailer ball 10 by means of a conventional locking mechanism 18. The sleeve 4 is slidable along the cable loop 6 to open and close the loop as necessary to permit the attachment.

Figure 5:
FIG. 5 shows an isometric view of the cable loop.
Figure 3:
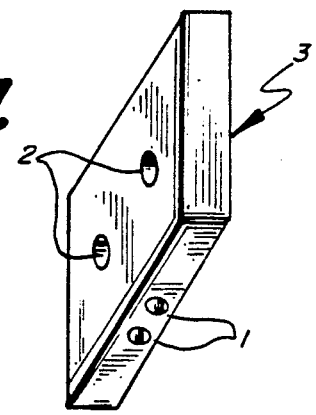
FIG. 3 shows an isometric view of the ferrule.
Figure 4:
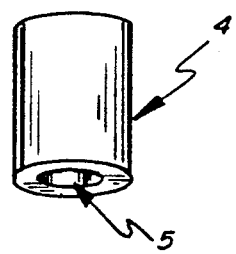
FIG. 4 shows an isometric view of the sleeve.

FIG. 3 shows the ferrule 3 in isometric view, illustrating the openings 2 through which the bolts 15–16 may be connected. A pair of openings 1 are formed along one edge of ferrule 3 in order to accept the two ends of cable loop 6. The two ends of cable loop 6 may be affixed into openings 1 by means of conventional fastening techniques. FIG. 4 shows sleeve 4 having an internal opening 5 through which the cable 6 may be passed prior to securing the open ends of cable 6 into ferrule openings 1. FIG. 5 shows an isometric view of cable loop 6 prior to attachment.

The two ends of cable 6 are inserted into the hole 5 of the sleeve 4. The ends of the cable 6 are then drawn through the hole 5 in the sleeve 4 and inserted into the holes 1 in the side of the ferrule 3, and pressed under great pressure. This process secures the cable 6 to the ferrule 3.

The ferrule 3 is then bolted to the underside of the tongue 14 just behind the coupler socket 12. The two bolt holes 2 in ferrule 3 permit this connection.

Before lowering the coupler socket 12 to the ball 10, the cable 6 is placed over the ball, encircling the shank of the ball hitch. The sleeve 4 is then drawn tightly against the shank of the ball hitch, tightening the loop on the cable 6. The coupler socket 12 is then lowered onto the ball 10.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A trailer hitch safety cable apparatus for safety attachment of a trailer tongue to a trailer hitch ball at an attachment point along the longitudinal axis of the trailer tongue and immediately behind a trailer coupler, comprising a ferrule plate sized to fit along an inside surface of said tongue, means for attachment of said ferrule plate against said tongue along the longitudinal axis of said tongue; said means comprising at least one hole in said ferrule plate for containing a fastener for connection to said tongue, said ferrule plate having two holes perpendicularly aligned with respect to said at least one hole; a cable loop having two ends affixed to said ferrule plate, in said two holes and having a loop size sufficient to extend forwardly beneath said trailer coupler; and a sleeve encircling said cable loop, said sleeve having an opening sufficiently large to permit slidable engagement about said cable loop to permit said sleeve to be moved along said loop to form a loop closure about said trailer hitch ball shank.

* * * * *